US012706880B2

(12) United States Patent
Greene et al.

(10) Patent No.: US 12,706,880 B2
(45) Date of Patent: Aug. 11, 2026

(54) SENSITIVE DATA PROXY

(71) Applicant: Apilyze Inc., The Hills, TX (US)

(72) Inventors: James Greene, Mesa, AZ (US); Anirban Banerjee, The Hills, TX (US); Jonathan Aaron Litovitz, Thornhill (CA)

(73) Assignee: Apilyze, Inc., The Hills, TX (US)

( * ) Notice: Subject to any disclaimer, the term of this patent is extended or adjusted under 35 U.S.C. 154(b) by 82 days.

(21) Appl. No.: 18/649,286

(22) Filed: Apr. 29, 2024

(65) Prior Publication Data

US 2025/0016138 A1 Jan. 9, 2025

Related U.S. Application Data

(60) Provisional application No. 63/585,666, filed on Sep. 27, 2023, provisional application No. 63/512,391, filed on Jul. 7, 2023.

(51) Int. Cl.
*H04L 9/40* (2022.01)

(52) U.S. Cl.
CPC ...... *H04L 63/0263* (2013.01); *H04L 63/0823* (2013.01)

(58) Field of Classification Search
None
See application file for complete search history.

(56) References Cited

U.S. PATENT DOCUMENTS

| | | | | |
|---|---|---|---|---|
| 8,826,443 | B1 * | 9/2014 | Raman | G06F 21/6245 726/26 |
| 2016/0117495 | A1 * | 4/2016 | Li | G06F 21/6209 726/1 |
| 2016/0119374 | A1 * | 4/2016 | Williams | H04L 9/3263 713/175 |
| 2017/0078328 | A1 * | 3/2017 | McGinnity | H04L 63/0823 |
| 2020/0110902 | A1 * | 4/2020 | Zakour | G06F 16/22 |
| 2020/0293685 | A1 * | 9/2020 | Levay | G06F 16/258 |
| 2024/0348459 | A1 * | 10/2024 | Narayanaswamy | H04L 9/3265 |
| 2024/0403374 | A1 * | 12/2024 | Dang | G06F 21/6227 |

OTHER PUBLICATIONS

PortSwigger web page located at https://portswigger.net/burp/documentation/desktop/tools/proxy, accessed Apr. 29, 2024.
PortSwigger web page located at https://portswigger.net/burp/documentation, accessed Apr. 29, 2024.

* cited by examiner

*Primary Examiner* — Christopher C Harris

(57) ABSTRACT

Systems and methods are disclosed for implementing sensitive data proxy. In certain embodiments, a method may comprise implementing a sensitive data proxy configured to prevent unintended traffic from a client system to a target domain, including receiving a message from the client system intended for the target domain, determining a security rule to apply to the message, evaluating the message for compliance with the security rule, applying a corrective action to the message to bring the message into compliance with the security rule, and forwarding the message to the target domain based on the message being in compliance with the security rule.

20 Claims, 4 Drawing Sheets

SENSITIVE DATA PROXY

CROSS-REFERENCE TO RELATED APPLICATION

The present application claims priority to U.S. provisional patent application, Ser. No. 63/512,391, filed Jul. 7, 2023, entitled "Sensitive Data Proxy"; and to U.S. provisional patent applications Ser. No. 63/585,666, filed Sep. 27, 2023, entitled "Riscosity Proxy," the contents of which are hereby incorporated by reference in their entirety.

SUMMARY

In certain embodiments, a method may comprise implementing a sensitive data proxy configured to prevent unintended traffic from a client system to a target domain, including receiving a message from the client system intended for the target domain, determining a security rule to apply to the message, evaluating the message for compliance with the security rule, applying a corrective action to the message to bring the message into compliance with the security rule, and forwarding the message to the target domain based on the message being in compliance with the security rule.

In certain embodiments, a system may comprise a sensitive data proxy computing environment configured to prevent unintended traffic from a client system to a target domain. The system may receive a message from the client system intended for the target domain, determine a security rule to apply to the message, evaluate the message for compliance with the security rule, apply a corrective action to the message to bring the message into compliance with the security rule, and forward the message to the target domain based on the message being in compliance with the security rule.

In certain embodiments, a computer-readable storage medium may store instructions that, when executed, cause a processor to perform a method comprising implementing a sensitive data proxy configured to prevent unintended traffic from a client system to a target domain. The method may include receiving a message from the client system intended for the target domain, determining a security rule to apply to the message, evaluating the message for compliance with the security rule, including determining whether the message includes sensitive data, applying a corrective action to the message to bring the message into compliance with the security rule, including not forwarding the message with sensitive data to the target domain, and forwarding the message to the target domain based on the message being in compliance with the security rule.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure. The following description and associated figures teach the best mode of the invention. For the purpose of teaching inventive principles, some aspects of the best mode may be simplified or omitted.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
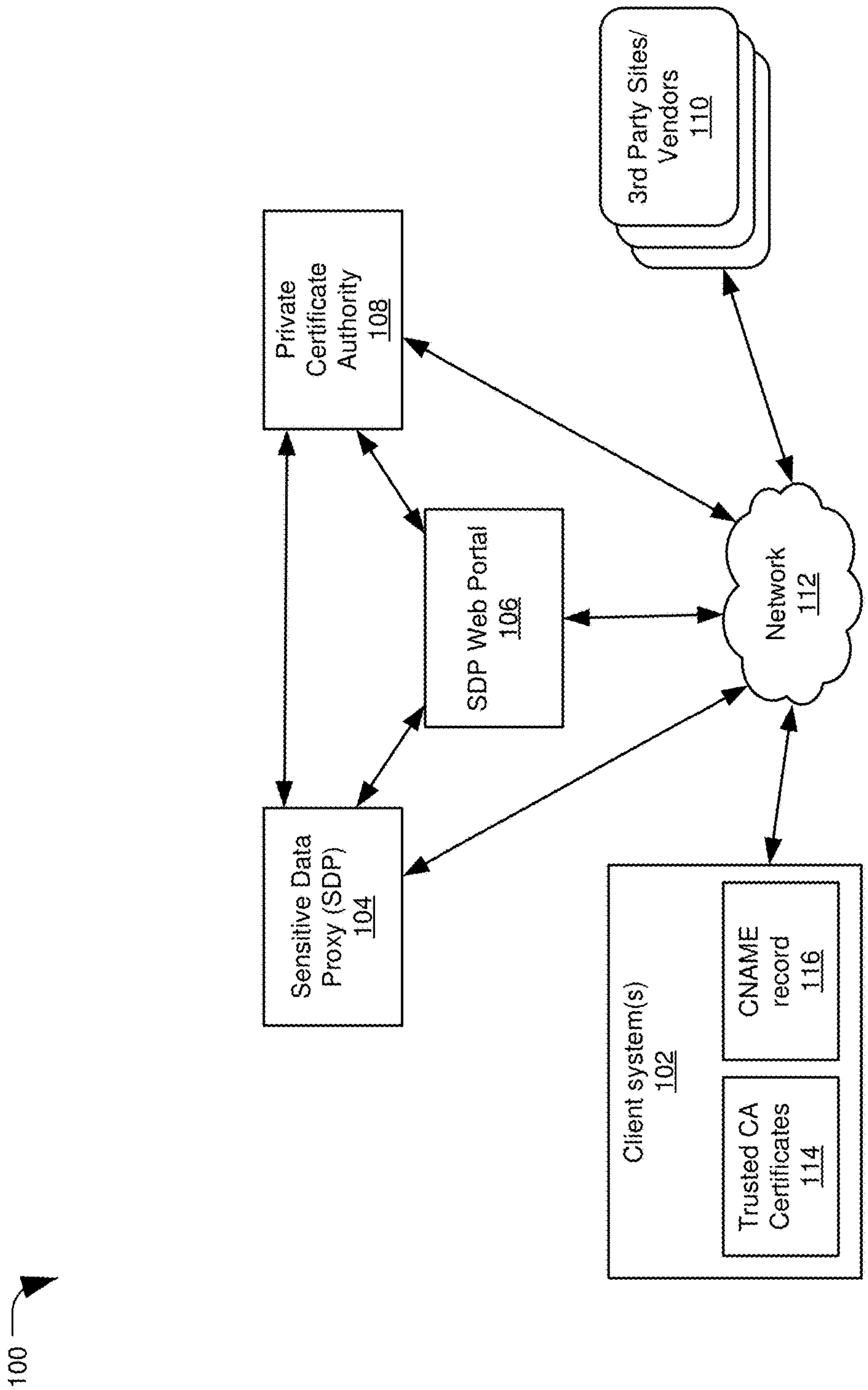
FIG. 1 is a diagram of a system configured to implement a sensitive data proxy, in accordance with certain embodiments of the present disclosure.

FIG. 1 is a diagram of a system 100 configured to implement a sensitive data proxy, in accordance with certain embodiments of the present disclosure. The example system 100 may include a client system 102, a sensitive data proxy (SDP) 104, an SDP web portal 106, a private certificate authority (CA) 108, one or more third party domains, websites, cloud services, or vendors 110, and one or more networks 112, such as the internet or cloud environments such as Amazon web Services® (AWS®) cloud infrastructure. The components of system 100 may be implemented via one or more computers, routers, switches, servers, web services, applications, modules, other components, or a combination thereof.

When a client 102 connects to another system over a network 112, it may exchange communications in the form of application program interface (API) requests or instructions (e.g., a RESTful .json API request), emails, texts, website data, or other information. The communications may be encrypted during transmission, e.g., via transport layer security (TLS) protocols via HTTPS communications or secure socket layer (SSL) protection, to guard against unauthorized third-party snooping. However, the designated recipient of the transmission can access the transmission, and any data included in the message. If a client 102 sends a message to a designated third-party vendor 110 that includes sensitive information (e.g., credit card data, social security numbers, or other protected data), the third-party vendor 110 may be given full access to the data even if the data was inadvertently shared or should not have been included in the message.

Accordingly, a system to monitor for, and then potentially manage, sensitive data within communications via an SDP 104 is presented herein. An SDP 104 may operate as a security point for communications between a client 102 and third-party site 110, and may check the communications for potentially sensitive data. The SDP 104 may alternately be referred to as a Riscosity proxy, "control valve", or by other terms. When sensitive data is found within a communication, the SDP 104 may take a variety of measures, which may be selected by the client 102. For example, the SDP 104 may block the message entirely, send a notification to the client 102 while forwarding the message to the third-party site 110, hold the message until the client 102 provides authorization to forward it (or the request times out), or even redact the sensitive data out of the message before forwarding it. In addition, the SDP 104 may also log transmissions and monitor factors like total number of transmissions or volume of transmitted data, and may block, rate limit, or send notifications to the client 102 if the transmissions are not within expected parameters (e.g., too frequent, too large, or otherwise outside of specified limits).

Client 102 may coordinate with the SDP provider 104 regarding transmissions to monitor. For example, the client 102 may utilize an SDP web portal or application 106 to designate which third party sites 110 the SDP 104 should act as a proxy for. Transmissions sent from client system 102 and ultimately intended for a selected third-party site 110 may be encrypted e.g., per SSL or TLS, requiring an appropriate web certificate to access the message. As the SDP 104 is not the ultimate intended recipient, it may not normally be able to access and review the message for sensitive data.

Accordingly, the SDP 104 may employ a private certificate authority (CA) 108 to generate an SSL or similar certificate for the target domain names or subnames of the third party site 110. However, the client 102 may only be configured to recognize certificates from known and trusted CAs. Therefore, the SDP (e.g., through SDP web portal 106 or through instructions to an administrator of client 102), may add a CA certificate for the private CA 108 to the client's list of trusted CAs 114. The SSL certificate generated by the private CA 108 for the SDP 104 may be made to include all domains or subdomains for which the client 102 has selected proxy review (e.g., via the SDP web portal 106), and therefore all traffic from the client 102 through the SDP 104 can be reviewed for sensitive data. For the intended communications to be reviewed, the CNAME (canonical name) records 116 or other domain name system (DNS) records at the client 102 may be modified to direct traffic for the selected third-party sites 110 to instead be routed to the SDP 104.

According to the described infrastructure, when messages will be sent from client 102 to a selected third party site 110, the message may be encoded and re-directed to the SDP 104 based on the client's CNAME records 116. As the SDP's private CA 108 may be included in the trusted CA list 114 of the client 102, the SDP 104 should be able to decrypt and review the message with its local certificate. The SDP 104 may apply message review rules, either default or selected by the client 102 (e.g., via the SDP web portal 106). The SDP 104 may log received messages, and messages that pass the criteria to be forwarded may be transmitted from the SDP 104 to the original target third party vendor 110, e.g., via network 112. The SDP 104 may search for sensitive data based on searching for text strings, such as numbers in certain formats corresponding to credit card numbers, social security numbers, phone numbers, birth dates, or other information.

The SDP 104, the SDP web portal 106, and the private CA 108 may all be co-located or co-hosted and able to communicate directly or locally, or one or more elements may be remote from the others, and communicate via a wide area network (WAN) such as network 112. In some examples, SDP web portal 106 may include an app running on client system 102 which communicates via API commands with SDP 104, private CA 108, or both.

The described system may provide enhanced security for a client 102 to watch for unauthorized or inadvertent transmission of sensitive data. The system may be implemented via changes to files at the client, such as the trusted CA certificates 114 and CNAME records 116, without changing code or installing software at the client 102. The solution may support cloud platforms such as Amazon web Service® (AWS®), Google® cloud platform (GCP®), Azure®, or other services. A more detailed example implementation for a sensitive data proxy is described in regard to FIG. 2.

Figure 2:
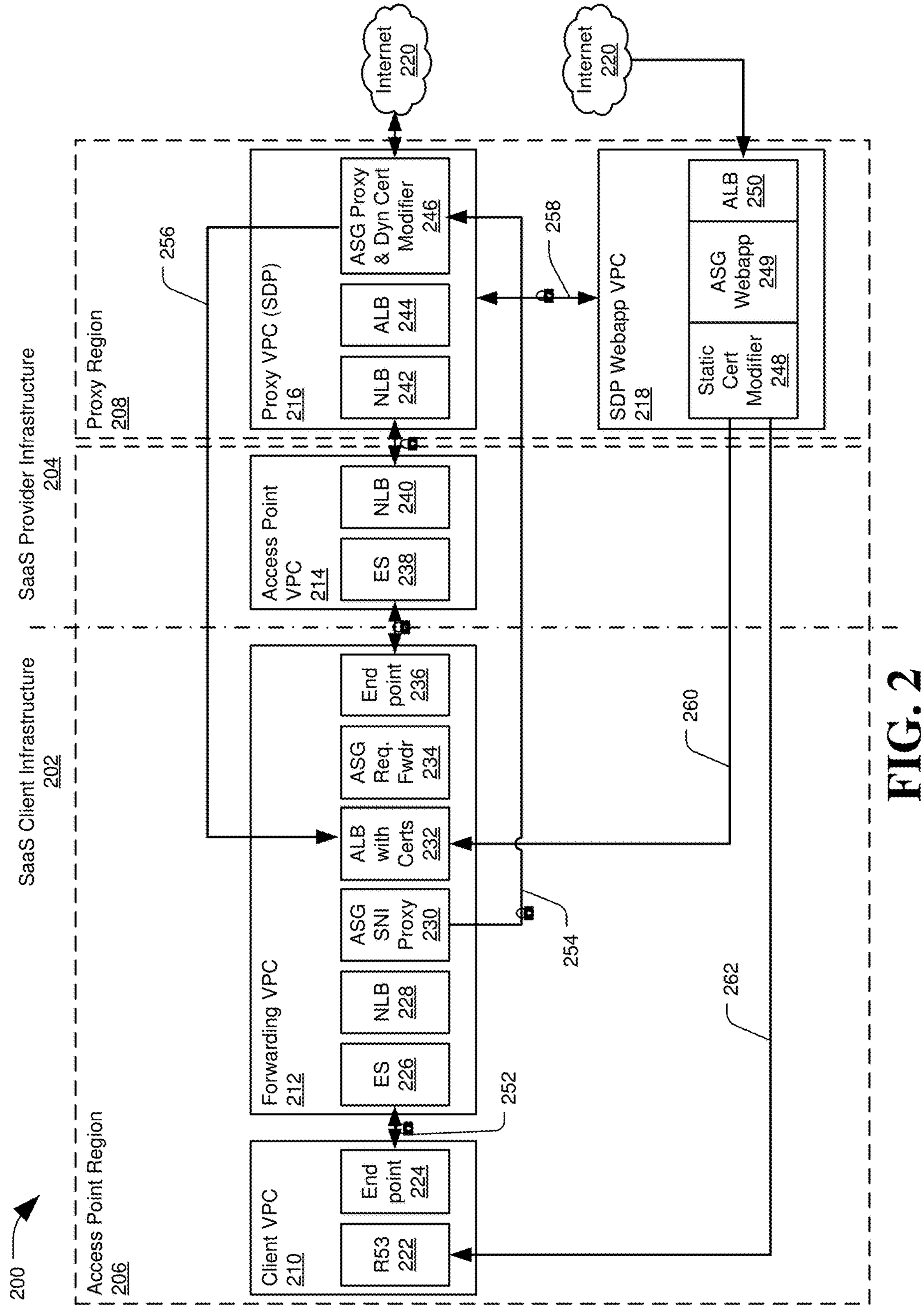
FIG. 2 is a diagram of a system configured to implement a sensitive data proxy, in accordance with certain embodiments of the present disclosure.

FIG. 2 depicts a diagram of a system 200 configured to implement a sensitive data proxy, in accordance with certain embodiments of the present disclosure. In particular, FIG. 2 presents an example arrangement of operational elements within virtual private cloud (VPC) environments to configure and utilize a sensitive data proxy. A VPC may be a secure, isolated private cloud hosted within a public cloud, such as AWS®. In some examples, such as AWS® cloud infrastructure, VPCs may be hosted in different AWS® "regions", although communication between AWS® regions may be performed without internet traversal, for example using AWS® backbone network infrastructure. In some embodiments, the VPC environments may be distributed between a software as a service (SaaS) client infrastructure 202 and a SaaS provider infrastructure 204, and further situated within an access point region 206 and a proxy region 208. Within the SaaS client infrastructure 202 in the access point region 206 may be a client VPC 210 and a forwarding VPC 212. Within the SaaS provider infrastructure 204, in the access point region 206 may be an access point VPC 214, and in the proxy region 208 may be a proxy VPC 216 and an SDP webapp VPC 218. The components described above may all be configured to communicate without traversing the internet, such as via AWS® backbone network infrastructure. However, some components may be configured with internet 220 access capabilities, such as forwarding VPC 212, access point VPC 214, proxy VPC 216, and webapp VPC 218, for example using egress-only access via an AWS NAT (network address translation) gateway. In some embodiments, elements such as proxy VPC 216 and webapp VPC 218 may be configured to communicate with the internet 220 using two-way communication via internet gateway, NAT (network address translation) gateways, or other protocols, as part of proxy routing setup and implementation. Components of system 200 may correspond to elements of FIG. 1, such as client VPC 210 and forwarding VPC 212 corresponding to client system 102, SDP webapp VPC 218 corresponding to SDP web portal 106, and proxy VPC 216 corresponding to SDP 104.

Sensitive data proxy functionality may be provided by a SaaS provider 204 to a SaaS client 202, or may be provided via on-premises deployment. A SaaS provider 204 or on-premises end user (e.g., the entity on whose account the SDP webapp VPC 218 and Proxy VPC 216 are installed) may be referred to as a primary consumer, and a SaaS client 202 may be referred to as a secondary consumer. A 'consumer,' used generally, may refer to any of the above. A client VPC 210 may be a pre-existing VPC that is owned or operated by a SaaS client 202 or provider 204, or an on-premises end user. As used herein, the term 'organization' may refer to an organization account that has been registered with an SDP web application (e.g., at SDP webapp VPC 218). It may be noted that an on-premises end user may specify what organization will be the SaaS provider 204, and may generally select themselves. However, an on-premises end user may select a different organization as SaaS provider 204, in which case Access Point VPC 214 may be part of the SaaS provider infrastructure 204, while the proxy VPC 216 and SDP webapp VPC 218 may be part of the on-premises end user infrastructure (not shown). However, such an arrangement may be less common and will not be focused on for the example of system 200.

As a broad overview, consumers may access an SDP webapp VPC 218 (e.g., via an installer webapp) to set up a proxy VPC 216 as an SDP for monitoring data transmissions between client VPCs 210 and selected target domains accessible through the internet 220. The consumer can use the webapp VPC 218 to deploy an SDP VPC 216, which may be situated in a same region 208 as the webapp VPC 218. “Regions” may correspond to geographic areas covered by one or more data centers or other delineations of a cloud infrastructure. For each region 206 where a client VPC 210 may be situated, a primary consumer may use the webapp VPC 218 to deploy an access point 214, thereby denoting the region as an “access point region” 206. The access point 214 may enable cross-regional communication between any given access point region 206 and the proxy region 208. Within each access point region 206, consumers (e.g., clients) may use the webapp VPC 218 to set up a forwarding VPC 212, and deploy a connection between a client VPC 210 and the forwarding VPC 212. An organization may have multiple client VPCs 210 connected to each forwarding VPC 212, and multiple forwarding VPCs 212 may be connected to each access point VPC 214. There may be multiple SaaS clients, each with their own set of client VPCs 210 and forwarding VPCs 212, with forwarding VPCs 212 from multiple SaaS clients connecting to a same access point VPC 214 for a region at any given time. A SaaS client can include more than one organization and have multiple forwarding VPCs 212 connected to a single access point VPC 214. Since the primary consumer may deploy an access point VPC 214 in each region, there may be multiple access point VPCs 214 connected to the proxy VPC 216. For each client VPC 210, consumers may use the webapp VPC 218 to establish which third party domains or addresses they want traffic to route through the SDP 216. Traffic targeting the selected domains may then be passed from client VPC 210 to forwarding VPC 212, and then to access point VPC 214 within the access point region 206. The access point 214 may then send the traffic across regions to the proxy VPC 216 in the proxy region 208. The SDP 216 may then inspect the traffic and perform actions on the traffic according to rules set by the consumers via the webapp VPC 218. As appropriate, the SDP 216 may then forward the traffic to the internet 220 to be routed to the original intended third party target site. The consumers may use the webapp VPC 218 to set up the components of FIG. 2, along with generating a certificate authority (CA) certificate, which may be used to generate SSL certificates for the selected target domains, so that the proxy 216 can analyze the traffic and apply the appropriate rules.

Using AWS® cloud services as an example environment for setting up a sensitive data proxy, an on-premises end user may use services or applications to set up cloud infrastructure resources, such as Terraform®, CFT (AWS® CloudFormation), or AWS® Marketplace, as well as a sensitive data proxy deployer and installer to create the SDP web application VPC 218 in an AWS® region (e.g., proxy region 208) in one of the end user's AWS® accounts. The on-premises end user can optionally choose to deploy a sensitive data proxy (SDP) 216 after the initial setup of their web application VPC 218. As an example, the on-premises end user may utilize AWS® CFT to deploy an installer in the SDP Webapp VPC 218 (where the SDP Webapp VPC 218 may be a pre-existing VPC that the on-premises end user selects). The on-premises end user may utilize the installer to deploy elements such as the static certificate modifier 248, auto scaling group (ASG) webapp 249, and application load balancer (ALB) 250. Additionally, there may be a special toggle on the installer that allows the user to deploy the entire Proxy VPC 216 and all its internal components, where unlike the SDP Webapp VPC 218, the Proxy VPC 216 may be created from scratch. Before the proxy is deployed through the installer, the on-premises end user may decide on which organization will become the SaaS provider. This may require that at least one organization is registered with the ASG Webapp 249 prior to enabling the proxy in the installer. Accordingly, the typical installation flow may look like this: install 248, 249, 250, etc. from the installer, register at least one organization with the ASG Webapp 249, and enable the proxy 216 from the installer. Then, the ASG Webapp 249 may be used by the SaaS provider to deploy access points 214. The ASG Webapp 249 can also be used by any consumer to deploy forwarding VPCs 212, connections between client VPCs 210 and forwarding VPCs 212, and more. The web application VPC 218 may require at least one registered organization in order for the SDP 216 to be deployed. As an example, the on-premises end user can deploy the web application VPC 218, register their organization with the web application, and then deploy the SDP 216. When an SDP 216 is set up for the first time, the end user's organization may be given special access rights to the SDP.

When accessing the SDP web application VPC 218 (e.g., via webapp 249), the primary consumer can (at any time, even prior to SDP 216 installation) access the AWS® accounts dashboard of the SDP webapp VPC 218 to provide permanent or temporary credentials for AWS® accounts that the primary consumer has access to (these credentials can be rotated at any time, but the AWS® account ID that was originally associated with them may be immutable). If the SDP web application VPC 218 is deployed with an SDP 216, the AWS® proxy dashboards may also become available in the SDP web application VPC 218. The primary consumer can register at least one AWS® account with the SDP web application VPC 218 prior to interacting with the AWS® proxy dashboards.

When accessing the AWS® proxy dashboards, the primary consumer may first enter the AWS® proxy general settings, and set up and activate the SDP 216. When setting up and activating the SDP 216, the primary consumer can permanently assign the SDP a set of primary AWS® credentials. These AWS® credentials can map to the same AWS® account that deployed the SDP 216. The primary AWS® credentials for the SDP 216 may be used to perform operations on the SDP 216, such as connecting the SDP 216 to access points 214.

After activating the SDP 216, the primary consumer can create access points 214 for the SDP 216 through the SDP webapp VPC 218 (e.g., via webapp 249). The primary consumer can create as many access points 214 as they like; however, in some examples the SDP web application VPC 218 may limit primary consumers to one access point 214 per AWS® region (e.g., access point region 206). The primary consumer can permanently assign each access point 214 a root AWS® account, which may be used to perform operations on the access point 214. The root AWS® account of an access point 214 does not need to be the same AWS® account that deployed the SDP 216, but it may be an AWS® account that belongs to the primary consumer. Access points 214 may be used to provide the SDP 216 with communicative access via AWS® peering to any or all AWS® regions (e.g., access point regions 206) in which an access point 214 has been deployed.

In an example implementation, the above may cover features of the SDP 216 that only primary consumers can access. Other SDP 216 features may be accessed by both primary and secondary consumers. For example, all consumers can begin hooking up to an active SDP 216 by generating a certificate authority certificate for their organization, via SDP webapp VPC 218 (e.g., via webapp 249). As the webapp VPC 218 may store the files and instructions for generating a CA certificate, it may act as the private certificate authority, although other elements of system 200, or those not depicted, may perform some or all operations of a private CA, in some embodiments. For example, an AWS® certificate manager (ACM) may manage some operations for certificate generation or management, based on the CA files in some embodiments.

The private CA certificate can be used by the webapp VPC 218 to generate SSL certificates for accessing traffic to selected third party domains as part of the proxy process. After a CA is generated, it may be used to create a master private certificate set for an organization, e.g., including four master private certificates. Each organization may have their own CA along with the four master private certificates generated by their CA. A master copy of the private certificate set may be stored, along with the CA, in the SDP webapp VPC 218. An organization may possess one certificate authority certificate (and associated private certificate set). During the creation of an organization's forwarding VPC 212, a copy or clone of the organization's four master private certificates may be created as AWS® resources and attached to ALB 232. Each forwarding VPC 212 essentially has its own dedicated copy of these four master certificates.

The master certificate set may include what are known as self-signed certificates, or private SSL certificates. Self-signed certificates may be understood as SSL certificates that are not created or signed by a third-party CA. In the example of system 200, an organization's four master certificates may be created and signed using the organization's private CA certificate (which may happen immediately after the organization's CA is generated). Two of the four master certificates may be modified at various times by the static certificate modifier 248, while the other two may be modified at various times by the dynamic certificate modifier 246. The example embodiment of using four self-signed master certificates (per organization) may mean each organization receives four master certificates, which may be propagated at the appropriate times to the appropriate forwarding VPCs 212 by the static 248 and dynamic 246 certificate modifiers. As used herein, the term propagated here may refer to the process of synchronizing the master certificates with their ACM clones in the forwarding VPCs 212. The static certificate modifier 248 and the dynamic certificate modifier 246 may be responsible for both 1) modifying the appropriate master certificates, and 2) propagating the appropriate master certificates to the appropriate ACM certificate clones in the appropriate forwarding VPCs 212. The cloned certificates in each forwarding VPC 212 may be continuously synchronized with the four master certificates. Two of the clones may be copies of the two master certificates which are modified by the static certificate modifier 248, and the other two clones may be copies of the two master certificates which are modified by the dynamic certificate modifier 246. The reason each organization receives a total of four master certificates in this example (where two are modified by the static certificate modifier 248, and two are modified by the dynamic certificate modifier 246), instead of a total of two (where one is modified by the static certificate modifier, and one is modified by the dynamic certificate modifier), may be to help promote data redundancy in the system 200.

After generating a private certificate authority certificate, consumers can register regions 206 with the SDP 216. This may be different than registering an access point 214 with the SDP 216. Consumers may be limited to only register a region 206 with the SDP 216 if an access point 214 is installed in the region. Registering a region 206 with the SDP 216 via webapp VPC 218 may result in the webapp VPC 218 deploying a proxy forwarding mechanism or forwarding VPC 212 that forwards traffic to the region's 206 access point 214 by creating a private tunnel that plugs into the access point 214. In some embodiments, the SDP webapp VPC 218 may not allow consumers to register the same region 206 more than once. When registering a region 206, consumers may permanently assign the region 206 a root AWS® account, which may be used to perform operations on the proxy forwarding mechanism 212 deployed in the region. The root AWS® account of a registered region 206 does not need to be the same as the root AWS® account of the access point 214 it plugs into. For example, the root AWS® account of a registered region 206 may belong to a secondary consumer, and the root AWS® account of the access point 214 it plugs into may belong to the primary consumer. However, if the primary consumer is using their own SDP 216, the root AWS® account of a registered region 206 and the root AWS® account of the access point 214 it plugs into will be the same.

After registering a region 206 with the SDP 216, consumers can register their client VPCs 210 with the SDP 216. Any client VPC 210 can be registered with the SDP 216 as long as, 1) the AWS® region 206 the client VPC 210 resides in is registered with the SDP 216, and 2) the AWS® account that owns the client VPC 210 is registered with the SDP web application VPC 218. A client VPC 210 can be connected to the SDP 216 even if the AWS® account that owns it is not the same as the root AWS® account of the registered region 206 it resides in. This allows consumers who manage multiple AWS® accounts to reuse the proxy forwarding mechanism 212 deployed in their registered region 206. An organization can plug client VPCs 210 into a region 206 they registered. In some implementations, a consumer can only register a region 206 for their organization once, but different organizations can register the same region 206 for themselves (and doing so may securely deploy a distinct proxy forwarding mechanism 212 for that organization in the root AWS® account they assign to the region). This may be different from how access points 214 are deployed, wherein only the primary consumer's organization can deploy access points. In other words, an SDP 216 may be reached from multiple regions by an associated access point VPC 214 in each region. An access point VPC 214 in a region may be connected to multiple forwarding VPCs 212, and multiple client VPCs 210 may connect to each forwarding VPC 212.

Consumers can manage root domains (e.g. paypal.com, yahoo.ca, wikipedia.org, etc.) for proxying via the SDP webapp VPC 218. Managing root domains may include a variety of options for creating, activating, deactivating, and removing root domains for proxying purposes. An example set of management operations may be broadly outlined as follows:

1) "Creating" a root domain. This operation may allow for the initial creation of an inactive root domain (inactive meaning traffic for this root domain is not currently being sent to proxy VPC 216, from any client VPC 210). For example, if the new root domain is google-.com, then this causes the static certificate modifier 248 to add google.com and *.google.com as alt names to the organization's master private certificate set. The ACM clones at the ALB 232 may remain unmodified.
2) "Attaching" a client VPC 210 to an inactive root domain. This may take the form of a database operation behind the scenes at the webapp VPC 218. The user may attach the client VPC 210 to an inactive root domain in the frontend ASG webapp 249, which may cause the database operation to be implemented by the webapp VPC 218 on the backend.
3) "Unattaching" or detaching a client VPC 210 from an inactive root domain. The opposite of attaching a client VPC 210 to an inactive root domain, unattaching or detaching may also be implemented via a database operation at the webapp VPC 218. A user may unattach the client VPC 210 from a selected inactive root domain via the ASG webapp 249, which may cause the SDP webapp VPC 218 to perform a database on the backend that dissociates the client VPC 210 from the selected root domain.
4) "Activating" an inactive root domain. A root domain may be considered active once any client VPC 210 is having traffic for that root domain proxied through the proxy VPC 216. Activating a root domain may deploy a route 53 222 private hosted zone for each client VPC 210 that is currently attached to the root domain (one private hosted zone per root domain may be deployed per currently attached client VPC 210). Deploying the private hosted zone may include adding routing information to the R53 222 for the corresponding root domain and any subdomains, causing traffic for those domains to be routed from client VPC 210 to forwarding VPC 212, and ultimately to be proxied through SDP 216. Additionally, activating a root domain may cause the static certificate modifier 248 to intelligently propagate the master private certificates to the appropriate ACM clones at ALB 232. The ACM clones affected may depend on the client VPC(s) 210 that are currently attached to the root domain being activated. Any forwarding VPC 212 that is servicing at least one attached client VPC 210 may be investigated by the static certificate modifier 248, and if its ACM clones are out of sync with the master private certificate set, the static certificate modifier 248 can update the ACM clones accordingly.
5) "Attaching" a client VPC 210 to an activated root domain. This operation may be the same as 4), except it may be specific to the client VPC 210 being attached. The client VPC 210 being attached to the root domain may have a route 53 222 private hosted zone deployed for it. Additionally, the forwarding VPC 212 that the client VPC 210 communicates with may be investigated by the static certificate modifier 248. If the forwarding VPC 212 has an ALB 232 that is attached to old ACM clones that are out of sync with the master private certificate set, then these old ACM clones may be updated accordingly.
6) "Unattaching" or detaching a client VPC 210 from an activated root domain. The client VPC 210 that is unattached may have its associated private hosted zone removed (e.g., by deleting or deactivating the routing information at R53 222 for that root domain). Then the client VPC 210 may be unattached via a database operation performed by the webapp VPC 218 on the backend.
7) "Deactivating" an active root domain. All client VPCs 210 that are currently attached may remain attached; however, their private hosted zones are removed from R53 222, and the root domain may enter an 'inactive' state.
8) "Deleting" an inactive root domain. When a user deletes an inactive root domain, it may cause the webapp VPC 218 to perform a database operation behind the scenes that deletes the root domain. In some embodiments, this operation may only be performed on an inactive root domain.

The private CA certificate may be used to generate SSL certificates to enable the proxy system to access encrypted domain-bound HTTPS traffic. As noted above, the SSL certificates may be in the form of a master private certificate set for each organization, e.g. stored at the webapp VPC 218. Copies or clones of the generated master SSL certificates may be created as ACM resources and attached to the HTTPS listener of the ALB 232 of a forwarding VPC 212 when an organization registers the associated region 206. The alt names of these ACM copies or clones may be continuously updated by the static certificate modifier 248 and dynamic certificate modifier 246 when appropriate. There may be a number (e.g., four) master private certificates at the SDP webapp 218, and a corresponding number of ACM clones at each forwarding VPC 212, one for each master private certificate. When an inactive root domain for routing is first added for the proxy, the master certificate set may be updated (e.g., by static certificate modifier 248) to include the target root domain. In an example embodiment with four master private certificates and four corresponding ACM clones, two of the master certificates (and corresponding clones) may be managed by the static certificate modifier 248, and two of the master certificates (and corresponding clones) may be managed by the dynamic certificate modifier 246. When a root domain is activated for a client VPC 210, or when a new client VPC 210 is attached to an active root domain, the clone certificate set at the forwarding VPC(s) 212 may be updated or replaced with the current master set (to include the added root domains for routing). Further, routing information for that root domain may be added to the client VPC 210 (e.g., at R53 222) which may direct traffic for that root domain and all of its subdomains from the client VPC 210 to be directed to forwarding VPC 212, and from there to SDP 216. Activating a root domain can create a private hosted "zone" at the client VPC 210, such as an alternate DNS table entry, zone, or record for the root domain. The number of private hosted zones deployed may depend on the number of client VPCs 210 attached to the root domain, with a distinct private hosted zone for each client VPC 210. These private hosted zones may be ultimately responsible for routing specific or targeted domain-bound traffic from a specified client VPC 210 to the SDP 216.

When a client VPC 210 communicates with a proxy-covered target domain, HTTPS requests from the client VPC 210 may be redirected to the ALB 232 of the forwarding VPC 212. The ALB 232 may possess an HTTPS listener that has attached four ACM clones of the master certificates.

These clones may be exchanged during a handshake with the client VPC 210 for the establishment of HTTPS communication, as SSL certificates. The exchanged certificates clones may authenticate the forwarding VPC 212 to the client VPC 210 for receiving the communications, based on the private CA certificate recognized by the client VPC 210 and used to sign the cloned private certificate set. An example flow of traffic from a client VPC 210 to a target system via an SDP 216 will be described in regard to FIG. 2. If a particular target domain is not set up to go through the SDP 216, then traffic to that domain may not pass through system 200, and may instead go directly from a client VPC 210 to the target domain, e.g., through the internet 220.

Traffic flow may originate from a consumer's client VPC 210 as either an HTTP or HTTPS request to a specific or targeted root domain (e.g. paypal.com, yahoo.ca, wikipedia.org, etc.) or any of its subdomains. The request may include potentially sensitive client data for which the SDP 216 may analyze the traffic. If a root domain is currently 'activated' under the SDP 216 for the particular client VPC 210, then all traffic bound for this root domain may be redirected to the SDP 216 before being sent to the internet 220. For activated root domains, a route 53 222 element of client VPC 210 may be responsible for intercepting and routing domain-bound client VPC 210 traffic, in an example embodiment. Amazon Route 53® 222 may be a highly available and scalable Domain Name System (DNS) web service. Amazon Route 53® 222 can connect user requests to internet applications running on AWS® or on-premises. In the depicted embodiment, Amazon Route 53® 222 may direct the intercepted traffic to a VPC endpoint 224 in the client VPC 210. The Amazon Route 53® element 222 may know what root domains to redirect based on data received from the SDP webapp VPC 218 regarding deployed private hosted zones and CNAME and A records.

A service consumer may create a VPC endpoint 224 to connect the client VPC 210 to an endpoint service 226 of a service provider. The VPC endpoint 224 may be implemented in a consumer's client VPC 210, and can privately tunnel domain-bound traffic intercepted by route 53 222 to the regional forwarding VPC 212 owned by the consumer. This transfer may be performed using a secure connection such as an AWS® private link (indicated by a padlock icon on connection 252), which may privately transfer traffic over the AWS® global backbone. Within system 200, the client data from the request may be transferred over secure private links or peering connections within the AWS® system prior to being sent to the internet 220 by SDP 216, to prevent the client data from potentially being exposed before being cleared by the SDP 216 according to the traffic rules set by the client. For example, client VPC 210 may be connected to forwarding VPC 212 via private link, forwarding VPC 212 may be connected to access point VPC 214 via private link, access point VPC 214 may be connected to proxy VPC 216 via inter- or intra-region peering, and proxy VPC 216 may be connected to SDP webapp VPC 218 via intra-region peering 258.

The traffic from endpoint 224 may be directed to endpoint service 226 within a consumer's regional forwarding VPC 212. Service providers may create an endpoint service 226 to make a service available in a region. The endpoint service 226 may receive incoming private link traffic from all registered client VPCs 210 in the corresponding region 206. The endpoint service 226 may transfer incoming data to a network load balancer (NLB) 228 in the forwarding VPC 212.

NLBs 228 may distribute traffic based on network conditions. For example, if there are multiple NLB-target servers with duplicate data, the NLB 228 may route traffic based on predetermined server IP addresses or server availability. The NLB 228 in a consumer's regional forwarding VPC 212 may receive incoming traffic from the endpoint service 226 behind it. This network load balancer 228 may transfer incoming data to a standard SNI (Server Name Indication) proxy 230 in the same forwarding VPC 212.

SNI may be an addition to the TLS encryption protocol that enables a client device to specify the domain name it is trying to reach in the first step of the TLS handshake. An SNI proxy 230 may proxy incoming HTTP and TLS connections based on the hostname contained in the initial request of the TCP session. The purpose of SNI proxy 230 may be to capture the FQDN (fully qualified domain name) that a client device is trying to reach in the first step of the TLS handshake. Essentially, the SNI proxy 230 may forward all TCP packets to an application load balancer (ALB) 232 without corrupting them. However, the SNI proxy 230 may also analyze TCP packets that are part of the first step of incoming TLS handshakes, capture the FQDN associated with these packets, and asynchronously send the FQDN to the dynamic certificate modifier 246 by communicating with a secondary port on endpoint 236 or ALB 232 (a communication simplified for illustration via the padlock connection 254).

The standard SNI proxy 230 may be implemented in a consumer's regional forwarding VPC 212, and may be implemented with autoscaling via an auto scaling group (ASG). An ASG may contain a collection of EC2® (elastic compute cloud) instances that are treated as a logical grouping for the purposes of automatic scaling and management. Amazon® EC2® may be a web service that provides secure, resizable compute capacity in the cloud. The SNI proxy 230 may receive incoming traffic from the network load balancer 228, and transfer incoming data to the ALB 232 in the forwarding VPC 212.

While acting as a traffic intermediary, the SNI proxy 230 may also detect and capture FQDNs (fully qualified domain names) from encrypted TLS client hellos that pass through it. The FQDNs themselves may be passed in client hellos unencrypted, so that they may be read by the SNI proxy 230. An FQDN, sometimes also referred to as an absolute domain name, may be a domain name that specifies its exact location in the tree hierarchy of the Domain Name System (DNS). It may specify all domain levels, including the top-level domain and the root zone. If the SNI proxy 230 detects an FQDN with two or more subdomains, the SNI proxy 230 may forward the FQDN to a dynamic certificate modifier 246 in the proxy VPC 216, depicted via line 254, thereby enabling the SDP 216 to be made compatible with multi-level subdomains. The FQDN may be sent unencrypted or encrypted. Communication 254 may pass through other components (e.g., from SNI proxy 230 to endpoint 236, and then from endpoint 236 to dynamic certificate modifier 246 via a side connection or port), which may all be via AWS® backbone. Some connections, such as 256, 260, and 262, may not pass through AWS® backbone communication, but may still be secure. For example, connections 256, 260, 262, and other messaging (e.g., to set up access point VPCs 214, forwarding VPCs 212, etc.) may go over the internet, but may be secure API calls made using AWS® golang SDK (software development kit), the Pulumi AWS® plugin for golang, via other protocols or services, or any combination thereof.

The ASG proxy and dynamic certificate modifier 246 may be situated in the SDP proxy VPC 216. The dynamic certificate modifier 246 may use the appropriate consumer credentials (e.g., AWS® account credentials) and regional forwarding VPC 212 metadata (e.g., forwarding VPC identifier, AWS® resources associated with the forwarding VPC, an AWS® owner of the forwarding VPC) to update certificates attached to an HTTPS listener situated in the ALB 232, via line 256. The targeted certificates may be provided with additional alt names for dynamically discovered FQDNs that possess two or more subdomains.

The application load balancer (ALB) 232 may be situated in the regional forwarding VPC 212, and may receive incoming traffic from the standard SNI proxy 230. The ALB 232 (or another component of system 200) may include an HTTPS listener and a set of certificates (e.g., received from SDP webapp VPC 218 via line 260, through ACM, etc.) used to read the incoming traffic. The certificates may be dynamically updated by dynamic certificate modifier 246 to cover traffic to the root domain including two or more subdomains. The ALB 232 may terminate incoming HTTP and HTTPS requests after extracting and capturing the data from the requests. After request termination, the application load balancer 232 may transfer the captured data to a request forwarder 234 in the same forwarding VPC 212. Although the captured data has been decrypted by the ALB 232 in the example embodiment, the data may remain secured due to only being transferred over private secure connections within system 200. In the depicted embodiment, client requests may be decrypted at the forwarding VPC 212 via ALB 232; however, in other examples the SDP 216 may be provided with the certificates and configured to decrypt the client requests.

The request forwarder 234 may be implemented with autoscaling via an auto scaling group (ASG), and may be situated in a consumer's regional forwarding VPC 212. The request forwarder 234 may be a lightweight server configured to receive incoming traffic from the application load balancer 232, and append organization metadata, client VPC 210 metadata, or both to captured traffic before forwarding the traffic to a VPC endpoint 236. The organization or client VPC 210 metadata may identify the traffic being forwarded to the SDP 216, and allows the SDP 216 to differentiate between traffic that originates from distinct consumers or client VPCs 210. For example, in some embodiments an organization may select a set of sensitive data proxy rules to apply by the SDP 216 that cover all client VPCs 210 for the organization, and so only organization metadata may be needed to identify which rules to apply. In other examples, different rules may be set for each client VPC 210, so client VPC metadata may be used to determine which rules to apply.

The forwarding VPC endpoint 236 may be situated in a consumer's regional forwarding VPC 212, and may privately tunnel traffic from the request forwarder 234 to the primary consumer's regional access point VPC 214. This transfer may be performed using AWS® private link (as indicated by the padlock icon), which privately transfers traffic over the AWS® global backbone. In some examples, the traffic may be encrypted at the request forwarder 234, for example using a custom encryption scheme, and decrThe regional forwarding VPC 212 being described could belong to an arbitrary secondary consumer or even the primary consumer; however, all regional forwarding VPCs 212 ultimately funnel traffic into the regional access point 214 that is owned by the primary consumer. It is at this point that SaaS client traffic crosses over from the SaaS client infrastructure 202 into the infrastructure and systems owned by the SaaS provider 204. For an on-premise end user, the regional forwarding VPCs 212 and access points 214 may all be owned by the on-premise end user.

Access point endpoint service (ES) 238 may be situated in one of the regional access point VPCs 214 that belongs to the primary consumer. The ES 238 may receive incoming traffic from all registered proxy forwarding VPCs 212 in the access point region 206. The access point ES 238 may transfer incoming data to a network load balancer (NLB) 240 in the access point VPC 214.

The access point NLB 240 may be situated in one of the regional access point VPCs 214 that belongs to the primary consumer. This network load balancer 240 may receive incoming traffic from the access point endpoint service 238. The access point NLB 240 may use either inter- or intra-region peering to transfer incoming data to a final network load balancer 242 in the proxy VPC 216. The transfer may be private, with data only flowing over the AWS® global backbone. In some implementations, the access point NLB may first serve traffic to an auto scaled server that then leverages the existing peering connection to directly route captured traffic to the application load balancer (ALB) 244 in the SDP proxy VPC 216. This configuration may remove the need for a proxy NLB 242.

The proxy NLB 242 may be situated in the primary consumer's proxy VPC 216. The proxy NLB 242 may receive incoming traffic from across an inter- or intra-region peering connection from the access point VPC 214 in access point region 206. The proxy NLB 242 may transfer incoming data to the ALB 244 in the same proxy VPC 216.

The proxy ALB 244 may be situated in the primary consumer's proxy VPC 216. The proxy ALB 244 may receive incoming traffic from the proxy NLB 242, and transfer incoming data to the proxy 246 itself, which may be situated in the same proxy VPC 216.

The proxy and dynamic certificate manager 246 may be situated in the primary consumer's proxy VPC 216. The proxy 246 may be powered by AWS® autoscaling, and may be referred to as the auto scaling group (ASG) proxy 246. The ASG proxy 246 may receive incoming traffic from the ALB 244, e.g., including a decrypted HTTP or HTTPS request from client VPC 210 directed to a target domain activated for proxying. In some examples, the ASG proxy 246 may perform decryption on received traffic, such as if traffic is encrypted at ASG request forwarder 234. The ASG proxy 246 may share a database with the SDP web application VPC 218 (e.g., via intra-region peering, indicated by line 258), and may use this shared database to determine proxy rules that were specified by consumers. Because the request forwarder 234 may identify incoming traffic using organization metadata, the ASG proxy 246 may be able to determine where incoming traffic originates from and apply the correct proxy rules. The proxy rules may include performing actions as previously discussed herein, such as inspecting traffic from client VPC 210 to third party sites over the internet 220, including holding, blocking, or redacting traffic including sensitive data, monitoring a total amount of traffic or traffic rate, generating notifications about traffic that violates any set rules, and performing other sensitive data proxy actions. Traffic that the ASG proxy 246 approves for transmission to the ultimate third-party target may be forwarded to the target via the internet 220. In some examples, the ASG proxy 246 may package the transmission data into a new HTTP or HTTPS request, which in some examples may be encrypted using a public key of the target domain or site.

Consumers may connect to the SDP web application VPC 218 from the internet 220 using the application load balancer (ALB) 250. The ALB 250 may be situated in the webapp VPC 218, and may forward traffic to the ASG web application 249 (powered by AWS® autoscaling) and static certificate modifier 248. The SDP webapp 249 may be used to deploy access point VPCs 214, forwarding VPCs 212, connect client VPCs 210 to forwarding VPCs 212, and more. Connecting to the SDP webapp 249 via the internet 220 may allow consumers to configure various settings for an SDP 216, including which proxy rules to apply. The SDP webapp VPC 218 (e.g., via webapp 249 and static certificate modifier 248) may also deploy private hosted zones and CNAME and A records, e.g., to the R53 element 222 of client VPC 210 via line 262. The A and CNAME records are two ways to map a host name ("name") to one or more IP addresses. An A record points a name to a specific IP (e.g., example.com to 123.123.123.123). A Canonical Name (CNAME) record may be a type of resource record in the Domain Name System (DNS) that maps one domain name (an alias) to another (the canonical name). In the current example, for each route 53 222 private hosted zone that is created, the SDP webapp VPC 218 may provide a single A record and a single CNAME record. The A record may proxy-divert all traffic bound for a root domain (e.g., google.com). This means all traffic bound for google.com is sent to the proxy VPC 216 first. The CNAME record may proxy-divert all traffic bound for a root domain's subdomains (including all multi-level subdomains). This means all traffic bound for *.google.com, *.*.google.com, or *.*.*.google.com, etc., is sent to the proxy VPC 216 first. The private hosted zones deployed by the webapp VPC 218 may divert client VPC 210 traffic targeting specified domains to the SDP 216.

The ASG web application 249 and static certificate modifier 248 may use the AWS® account credentials of the appropriate consumers to orchestrate the correct assortment of regional access points 214 and all their associated services, regional forwarding VPCs 212 and all their associated services, client VPC endpoints 224, and private hosted zones+zone records.

The SDP webapp VPC 218 may include a static certificate modifier 248 that may be responsible for mutating an organization's master private certificate set and deploying these changes to the correct infrastructure in production. The static certificate modifier 248 may receive requests from a client to add new root domains and corresponding single-level wildcards (e.g., *.paypal.com) as alt names to the client's master private certificate set and the correct client-owned HTTPS ALB listener certs at ALB 232. When a consumer adds a new root domain to the SDP 216, the static certificate modifier 246 may update the organization's master private certificate set with new alt names: the root domain (e.g., paypal.com) and the first-level wildcard subdomain (e.g., *.paypal.com) of the root domain. Then whenever necessary, the static certificate modifier may intelligently propagate the correct master private certificates to the correct HTTPS listener certificates in the ALB 232 of the correct regional forwarding VPC 212 for the correct organization, e.g., via line 260.

After the static certificate modifier 248 updates an organization's master private certificate set with new alt names, the updated master private certificates may be intelligently propagated to AWS® certificate manager (ACM) resources on AWS®. ACM resources may be tied to proxy forwarding mechanisms, such as forwarding VPC 212. Because a consumer can have multiple proxy forwarding mechanisms 212 deployed at the same time, and because each proxy forwarding mechanism 212 may be tied to its own region 206, and each proxy forwarding mechanism 212 may possess its own distinct set of ACM resources, the ASG webapp 249 and static certificate modifier 248 may be configured to carefully recognize which ACM resources need to be updated depending on the client VPCs 210 that are newly attached to an activated domain. If an example client VPC X is attached to an activated domain paypal.com (or if client VPC X is already attached to a newly activated domain paypal.com), the proxy forwarding mechanism Y that serves VPC X should have its ACM resources updated by the static certificate modifier 248.

As the example SDP service of system 200 may be a merge of both SaaS and on-premise technology, the same 'central' static certificate modifier 248 may be updating each organization's master private certificate set (e.g., as located at ALB 232). It may be noted that in SaaS deployments, the same 'central' dynamic certificate modifier 248 may also be responsible for updating each organization's master private certificate set. The SDP webapp VPC 218 may include multiple database-level locking mechanisms deployed in order to avoid any race conditions that might arise from a same master private certificate or ACM certificate copy or clone receiving two modifications simultaneously. For example, race conditions may occur when two root domains are created at the same time for the same organization, or when the static certificate modifier 248 tries to modify the same ALB 232 for the same forwarding VPC 212 in two different threads at the same time. The dynamic certificate modifier 246 in particular can be bombarded with requests to modify the same organization's master private certificate set, and this may require the implementation of locking mechanisms to resolve. Avoiding race conditions may be a reason to have, e.g., four master private certificates in the private certificate set for each client. Two of these master private certificates may be modified by the static certificate modifier 248 when a consumer adds a new root domain. The other two master private certificates may be modified exclusively by the dynamic certificate modifier 246, providing a design that helps eliminate the possibility of certain types of race conditions that would otherwise occur between the dynamic 246 and static 248 certificate modifiers.

Since a root domain's first-level wildcard subdomain (e.g., *.paypal.com) may not cover second-level or higher subdomains (e.g., *.paypal.com does not cover api.api.paypal.com or api.api.api.paypal.com), the dynamic certificate modifier in the ASG proxy 246 may be required for decrypting incoming domain-bound traffic targeting higher-level subdomains. The dynamic certificate modifier 246 may also work by altering the master private certificate set of an appropriately identified organization and providing the master private certificate set with new alt names that conform to the following example standard:

*.<unique-first-level-subdomain>.<unique-domain>.<unique-top-level-domain>

*.<unique-second-level-subdomain>.<unique-first-level-subdomain>.<unique-domain>.<unique-top-level-domain>

*.<unique-third-level-subdomain>.<unique-second-level-subdomain>.<unique-first-level-subdomain>.<unique-domain>.<unique-top-level-domain> etc. (the pattern may continue thus)

The dynamic certificate modifier 246 may know which alt names to add to the master private certificate sets it modifies based on incoming requests from the standard SNI proxies 230 via line 254. After updating an organization's master private certificate set, the dynamic certificate modifier 246 may then update the appropriate HTTPS listener certificates in the ALB 232 of the appropriate regional forwarding VPC 212 belonging to the appropriate organization. After the dynamic certificate modifier 246 adds new alt names to an organization's master private certificate set, the dynamic certificate modifier 246 may carefully propagate the updated master private certificate set to the appropriate ACM resources (e.g., the HTTPS listener certificates at ALB 232) belonging to the proxy forwarding mechanism 212 that encountered the FQDN with multi-level (>=2) subdomains. Any arbitrary proxy forwarding mechanism 212 may communicate with the dynamic certificate modifier 246 (even proxy forwarding mechanisms 212 that belong to different consumers in SaaS), so the dynamic certificate modifier 246 may be configured to know which ACM resources to correctly modify.

The unique setup of communication between the standard SNI proxies 230 and the dynamic certificate modifier of the ASG proxy 246 may allow the SDP 216 to decrypt domain-bound traffic targeting higher-level (e.g., >=2) subdomains in real time. This may provide, in essence, automated deep subdomain discoverability achieved for a centralized SaaS and on-premise hybrid proxy that decrypts incoming traffic by using and dynamically modifying AWS® infrastructure (like ACM) in order to privately service any region. And as mentioned earlier, the dynamic certificate modifier 246 resides in the proxy VPC 216, unlike the static certificate modifier 248 which resides in the SDP webapp VPC 218 (which may be done to optimize autoscaling).

The example system described in regard to FIG. 2 provides a number of useful advantages. The web application 248 can automate and massively simplify the otherwise complex process of flexibly and privately connecting any client VPC 210 to the SDP 216. The client VPC 210 can be privately connected to the SDP 216 over a private or secure connection such as the AWS® global backbone, even if the client VPC 210 resides in a different AWS® account, AWS® availability zone, or AWS® region or access point region 206. The Classless Inter-Domain Routing (CIDR) block configuration of the client VPC 210 may also be rendered irrelevant, as overlapping CIDRs may not prevent a client VPC 210 from connecting to the SDP 216. A CIDR may be an IP address allocation method that improves data routing efficiency on the internet. The above advantages may be achieved using AWS® techniques and constructs, such as combining AWS® private link and AWS® peering. Innovations include heavily generalizing and automating the process of hooking up any possible client VPC 210 to the SDP 216 via an easy-to-use SDP web application VPC 218 (e.g., via webapp 249).

The SDP web application VPC 218 (e.g., via webapp 249) can also automate the otherwise cumbersome task of using the correct AWS® credentials to mass-deploy private hosted zones on the correct client VPCs 210 and then creating their corresponding records. The web application VPC 218 may include a feature for 'activating' and 'deactivating' root domains. As used herein, there may be processes to 'add' root domains, "attach" a client VPC 210 to a root domain, and "activate" a root domain. A consumer may add a root domain, via the webapp VPC 218, for which the customer is interested in using the SDP 216. Adding the root domain may include entering the root domain in a database which may be maintained by the webapp VPC 218. However, a root domain that has been added but 1) has no attached client VPCs, or 2) is not yet activated, may not have its traffic run through the SDP 216. A consumer may 'attach' a client VPC 210, via webapp VPC 218, to a root domain that has been added, which may cause the client VPC 210 to be associated with the root domain in the database. However, traffic for that client VPC 210 to the root domain may not be proxied until the root domain is activated. 'Activating' a root domain may immediately begin routing all traffic intended for that root domain (and all of its subdomains) to the SDP 216 for every attached client VPC 210. Activation may be when the mass-deployment of private hosted zones occurs (e.g., the webapp VPC 218 may provide routing information for activated root domains for every attached client VPC 210). The static certificate modifier 248 may propagate master private certificates to the appropriate ALBs 232 in the appropriate forwarding VPCs 212 belonging to the appropriate organization when a root domain is activated or when a client VPC 210 is attached to an already activated root domain. When this happens, the master private certificates will already possess the appropriate root domain and its first-level wildcard subdomain as alt names, since the master private certificates obtain these essential alt names when a root domain is "added" for the first time. Consumers may also have the ability to 'attach' or 'detach' new or old client VPCs 210 from proxying for a root domain that is already activated. This ultimately gives a consumer the ability to use a single button click to initiate a process that will automatically process the creation or deletion of the correct private hosted zones through the web application VPC 218. 'Deactivating' root domains (e.g., removing the private hosted zones by removing or deleting the proxy routing information from the client VPC 210) may allow consumers to stop forwarding all root domain traffic to the SDP 216 for every client VPC 210 that was attached to the root domain.

The request forwarder 234 may be a lightweight mechanism that identifies the organization sending traffic to the SDP 216. This can allow the SDP 216 to be deployed as a SaaS service, rather than being limited to an on-premises implementation.

The static certificate modifier 248 can automate the otherwise cumbersome task of continuously adding new root domain and first-level wildcard subdomain FQDNs as alt names to the correct master private certificate sets, and intelligently deploy these updated certificates to the correct infrastructure in production. More specifically, the static certificate modifier 248 may also propagate updated master private certificate sets to the appropriate ACM resources (e.g., HTTPS listener certificates at an ALB 232 of the appropriate forwarding VPC 212). The static certificate modifier 248 may be configured to "know" which ACM resources it needs to update, as described above in regard to updating ACM resources.

The dynamic certificate modifier 246 can automate and address the problem of deep subdomain discoverability for a centralized SaaS and on-premise hybrid proxy that decrypts incoming traffic by using and dynamically modifying AWS® infrastructure (like ACM) in order to privately service any region 206. And like the static certificate modifier 248, the dynamic certificate modifier 246 can also automate the process of continuously mutating the correct master private certificate sets and intelligently deploying these updated certificates to the correct infrastructure in production. For example, the dynamic certificate modifier 246 may propagate updated master private certificate sets to the appropriate ACM resources (e.g., HTTPS listener certificates at an ALB 232 of the appropriate forwarding VPC 212). However, unlike the static certificate modifier 248, the dynamic certificate modifier 246 can mutate master private certificate sets by adding new FQDN alt names that possess multi-level (>=2) subdomains. Additionally, the dynamic certificate modifier 246 can do this on the fly by listening to multiple standard SNI proxies 230 that provide the dynamic certificate modifier 246 with new FQDNs as traffic flows from client VPCs 210 to the SDP 216.

A sensitive data proxy can be implemented in a number of ways, including as show in the example system 200, or in different arrangements. For example, in FIG. 2, the SDP Webapp VPC 218 and the Proxy VPC 216 are deployed in the same region, with access point VPCs 214 distributed to other regions. This may be advantageous because the inter-regional peering latency between an Access Point VPC 214 and the Proxy VPC 216 tends to be reasonable, especially when the Access Point VPC 214 is in the same continent as the Proxy VPC 216. However, as peered systems the proxy VPC 216 and webapp VPC 218 could be deployed in different regions. Situating both the proxy 216 and the webapp VPC 218 in the same region may be advantageous when, for example, the persistent data storage for the proxy VPC 216 is located in the SDP webapp VPC 218, to avoid inter-regional peering latency and bottlenecking when the proxy VPC 216 polls the data storage for proxy rules. However, in other embodiments the Proxy VPC 216 may include its own dedicated persistent data storage. In such a system, the SDP Webapp VPC 218 may deploy a Proxy VPC 216 for each region, instead of an Access Point VPC 214. A distributed proxy VPC 216 design may involve the synchronization of all permanent data storages across all regional Proxy VPCs 216, and the costs of persistent storage for each proxy VPC 216 may increase relative to the single proxy VPC 216 approach. Other embodiments are also possible, with potential advantages and disadvantages. An example process for a sensitive data proxy is discussed in regard to FIG. 3.

Figure 3:
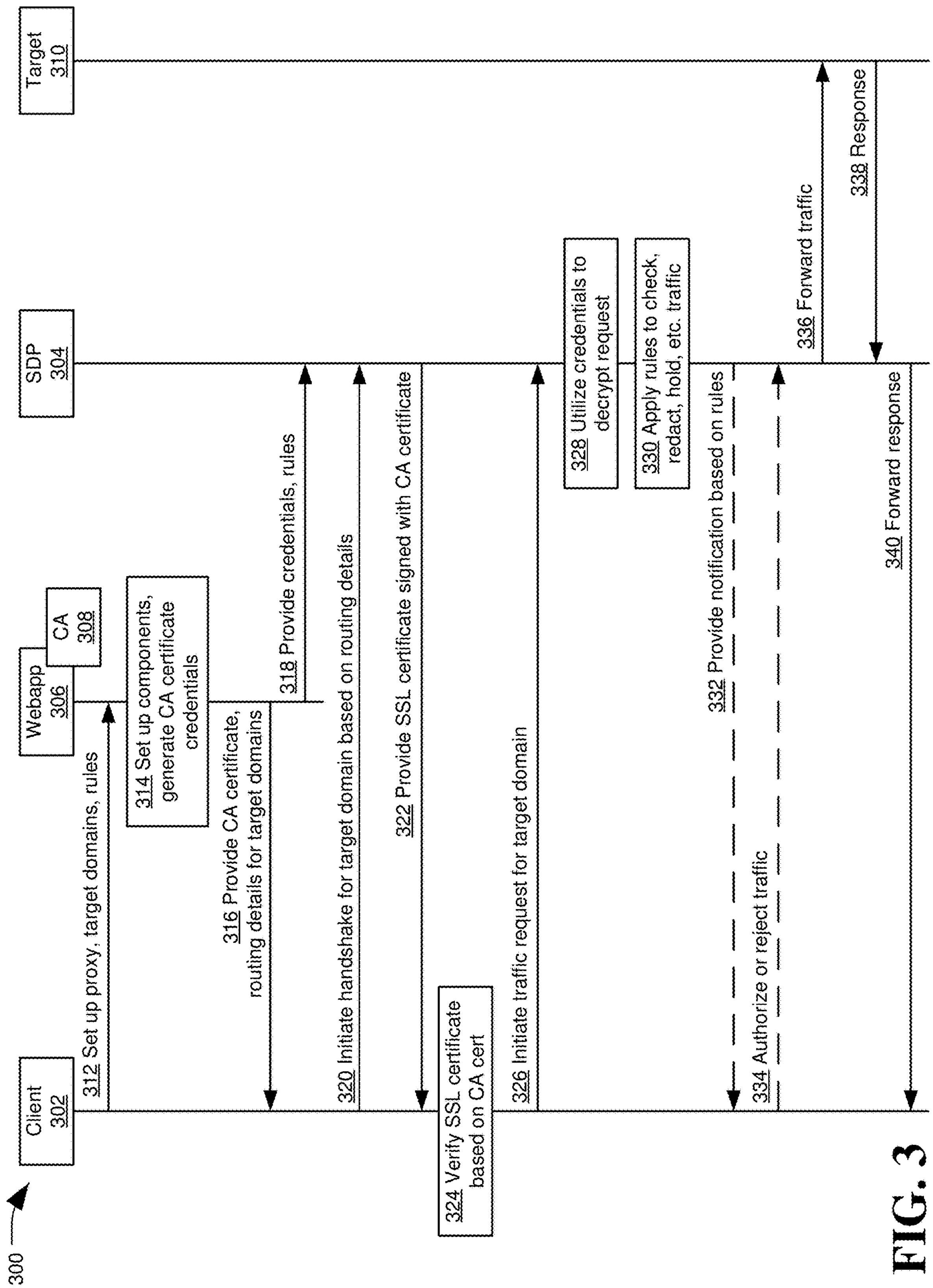
FIG. 3 depicts a process flow of an example method for implementing a sensitive data proxy, in accordance with certain embodiments of the present disclosure.

FIG. 3 depicts a process flow of an example method 300 for implementing a sensitive data proxy, in accordance with certain embodiments of the present disclosure. In particular, FIG. 3 presents an operational flow of an example embodiment of a sensitive data proxy system configured to analyze and apply rules to traffic from a client system 302 to a target domain 310. Process flow 300 may include a client system 302, a webapp 306 combined with a private certificate authority (CA) 308, a sensitive data proxy (SDP) 304, and a target site or domain 310, which may correspond to client system 102, SDP web portal 106 and private CA 108, SDP 104, and third-party sites/vendors 110 of FIG. 1, respectively. In some embodiments, client 302 may correspond to both elements such as administrator computers (e.g., for setting up accounts and settings via webapp 306), as well as virtual private cloud environments owned by a client organization, which may send HTTPS requests that may be monitored and edited by an SDP. Similarly, elements such as webapp 306, CA 308, and SDP 304 may include a variety of functionality distributed across various VPC environments, servers, and computing modules, with the system and functionality distribution shown in system 300 providing a example segregation of those elements and functions. The components of system 200 may communicate over one or more networks, such as network 112 of FIG. 1.

At 312, client 302 may communicate with webapp 306 to set up various elements and settings for a sensitive data proxy. For example, the client 302 may access the webapp 306 to set up an SDP 304, regional access points (e.g., access point VPC 214 of FIG. 2), forwarding mechanisms (e.g., forwarding VPC 212 of FIG. 2), client systems (e.g., client VPC 210 of FIG. 2), or other components, as well as associated cloud environment accounts, client identifiers or credentials, or other systems and data used for establishing an SDP 304 and any associated routing systems and processes. Further, the client 302 may access the webapp 306 to specify target domains (corresponding to targets 310) for which proxying through the SDP 304 is requested for each client system 302. For each target domain, client system 302, etc., the client 302 may access the webapp 306 to select or specify rules on how the SDP 304 should handle the corresponding traffic. The rules may include monitoring a total amount or rate of traffic, analyzing the traffic for including sensitive data, applying holds on specified traffic until receiving approval from client 302, redacting sensitive data, blocking traffic, logging traffic, or applying other functional rules.

At 314, the webapp 306 may set up components as specified by client 302 in setup communications 312, such as by setting up or establishing SDP 304, access point systems, forwarding systems, authorization, identification, and credential information, or other component systems and data. The webapp 306 may also create or operate as a CA 308 for client 302, including generating a CA certificate and associated credentials. The CA certificate may be provided to the client 302 to establish the CA 308 as a trusted source, thereby allowing the CA certificate to sign SSL certificates for the specified target domains and enable SDP 304 to read encrypted traffic for those target domains.

At 316, the webapp 306 may provide the CA certificate to the client 304, along with routing details for the specified selected target domains. The routing information may be stored at client 304, and cause traffic from client 304 intended for target 310 to be routed to SDP 304. The CA certificate credentials may also be stored at client 304, so client 304 can trust SSL certificates for domains that have been signed by CA 308, so that SDP 304 may be able to access communications to the target domains.

Similarly, webapp 306 may provide SDP 304 with credentials corresponding to CA 308, at 318. In this manner, the SDP 304 may be able to sign SSL certificates for the target domains during TLS handshake operations, if necessary, as well as decrypt and analyze traffic for the target domains 310. In some examples, the SSL certificates may be issued to client 302, or the traffic may be decoded, by another component of the proxy system other than SDP 304 (e.g., a forwarding mechanism may have a copy of certificates and decode traffic prior to forwarding request data to SDP 304). In addition, webapp 306 may provide the SDP 304 with the proxy rules to apply to the proxied traffic. The SDP 304 may request the rules for a corresponding target 310 and client 302 when traffic is received at the SDP 304, or the rules may be provided ahead of time and stored at SDP 304.

At 320, client 302 may initiate a TLS or other security handshake with SDP 304 for a target domain 310, based on the routing details received from webapp 306. For example, the client 302 handshake initiation may include details such as the intended target 310, what TLS version or ciphers the client 302 supports, potentially a random value string, or other data. In some examples, the client 302 or other component between client 302 and SDP 304 may include identifying information for the client 302 or an associated organization.

At 322, in response to the handshake initiation, the SDP 304 may generate and provide an SSL certificate for the target 310, signed by the CA's 308 certificate. In some embodiments, the SSL may be a self-signed certificate or certificate set, and may be generated when a client specifies a domain for which secure proxy services are to be applied, rather than in response to initiation of a handshake operation. The SSL certificate may include a public key of an asymmetric key pair, wherein the SDP 304 may possess the corresponding private key. The response message may also include a selected cipher or encryption system to use, a random value, or other details.

At 324, the client 302 may perform an authentication step, and verify the received SSL certificate based on the signature with the trusted CA 308 certificate. Based on the trusted CA certificate, the client 302 may accept that the SDP 304 is the target domain that the client expects to reach.

Based on authenticating the SDP 304, the client 302 may then initiate a traffic request for the target domain 310, again routed to SDP 304 based on the routing information received from the webapp 306. The request may include an HTTP or HTTPS request, and may be encrypted using the public key received with the SSL certificate, or with a shared "session" key coordinated between the client 302 and the SDP 304 (not shown).

At 328, the SDP 304 may receive the request, and utilize the credentials (e.g., either the private key corresponding to the public key from the SSL certificate, or the session key) to decrypt and read the request.

At 330, the SDP 304 may apply the proxy rules, which may have been set by client 302 or a default set, to the decrypted traffic request. The request may have had identifying information for the client 302 either included by the client 302 itself, or by an intermediary component between client 302 and SDP 304. Based on the identifying information, the SDP 304 may determine which rules to apply to the received request (as the SDP may receive traffic from multiple clients, each of which may have its own set of rules). The SDP 304 may retrieve the rules from webapp 306 at this point, or may have already received them and have them stored locally. The rules may direct the SDP to check the traffic for sensitive information that the client 302 does not want shared, and may hold, block, redact, or otherwise act upon the sensitive data in the traffic. The SDP 304 may also monitor a rate of traffic from client 302 to target 310, a total amount of traffic, or otherwise check for suspicious or selected traffic patterns. Further, the SDP 304 may create a log of traffic from client 302 to target 310 based on the rules, which may be checked by client 310.

In some embodiments, such as where the rules specify that the SDP 304 notify the client 302 of data in the traffic or a particular traffic pattern, the SDP 304 may provide the notification to the client 302 at 332. The notification 332 may include an HTTP response indicating a failure of request 326, for example if the request violates one or more proxy rules. The notification 332 may also include a notification outside of the HTTP request/response exchange, include a request (e.g., texted or emailed to an administrator of the client 302) that the client 302 check the contents of the traffic or the traffic pattern before the SDP 304 releases or forwards the traffic to the ultimate target destination 310, or requests that the client 302 corrects the deficiency in the message and resend it. In other embodiments, the notification at 332 may simply create a record or send a message for a specified event, without any expected response from the client 302.

At 334, the client 302 may send a response to the SDP 304 regarding the notification from 332, such as to re-send a message, or authorize or reject the traffic event. Authorizing the traffic may enable the SDP 304 to forward the traffic to the target destination 310, while rejecting the traffic may cause the SDP 304 to delete or destroy the traffic message without forwarding it. The response 334 may be provide from the client 302 to the SDP 304 outside of an HTTP exchange, such as via text, email, a phone call, or via a webapp (e.g., webapp 306).

At 336, the SDP 304 may forward the traffic to the target 310. Forwarding the traffic may include exchanging a TLS or other security handshake to establish a connection with the target 310 server, including obtaining an SSL certificate for the target 310 signed by an outside CA. The SDP 304 may then generate a new HTTP or HTTPS request including the data payload from the request received at 326 from the client 302. In some examples, the data may have been modified at the SDP 304, such as by removing, obscuring, or redacting sensitive data identified in the original traffic.

At 338, the target 310 may provide a response to the SDP 304 corresponding to the request received at 336. The response may be an acknowledgement that the traffic was received, or may include a substantive response to a request for information. At 340, the SDP 304 may forward the response to the client 302. Forwarding the response may include decrypting and re-packaging or encrypting the response received at 338, or forwarding the response 338 without decrypting and re-encrypting it. Further communications between client 302 and target 310 may continue from 320, or in some embodiments, 326. A computing system configured to perform the operations and methods described herein is provided in regard to FIG. 4.

Figure 4:
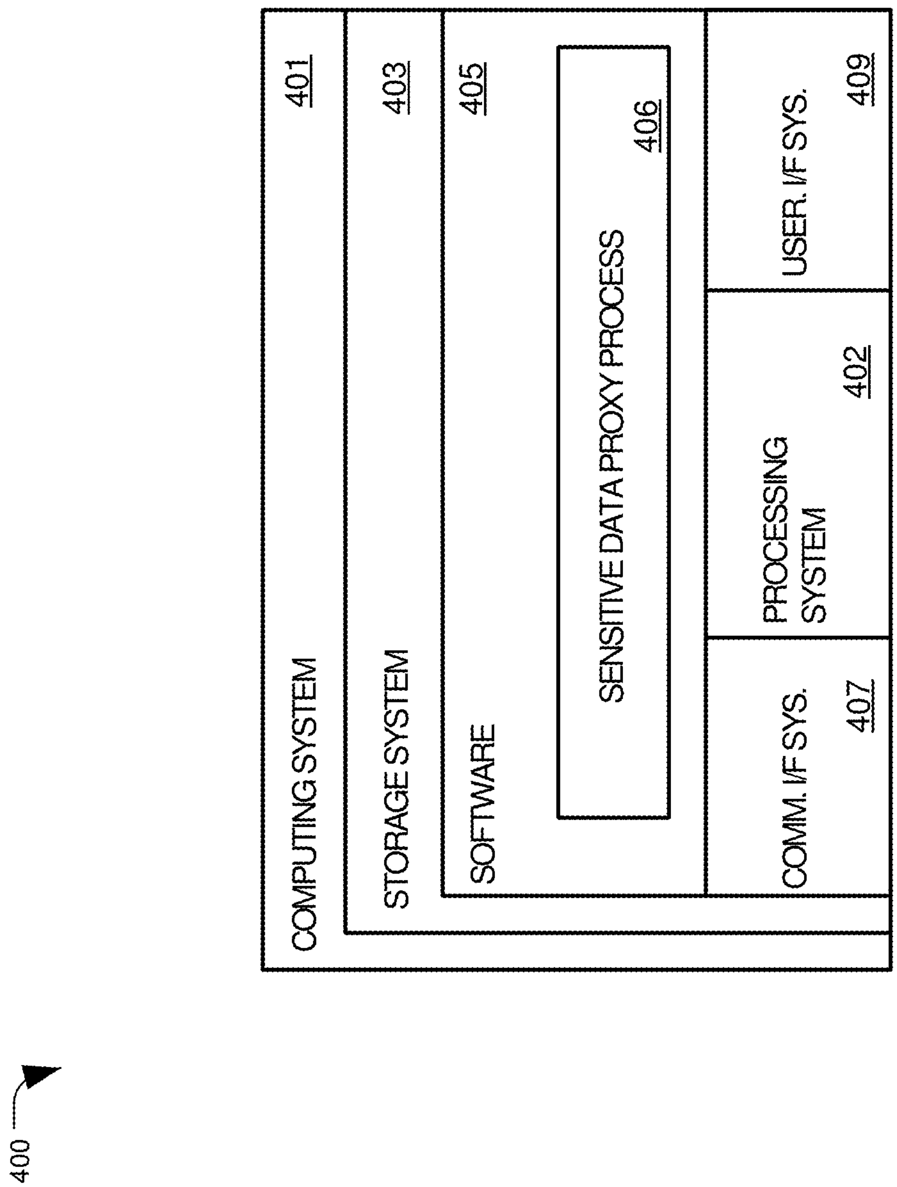
FIG. 4 is a diagram of a system configured to implement a sensitive data proxy, in accordance with certain embodiments of the present disclosure.

FIG. 4 illustrates an apparatus 400 including a computing system 401 that is representative of any system or collection of systems in which the various processes, systems, programs, services, and scenarios disclosed herein may be implemented. For example, computing system 401 may be an example of client 102, SDP 104, SDP web portal 106, private CA 108, or network 112 of FIG. 1. Examples of computing system 401 include, but are not limited to, server computers, desktop computers, laptop computers, routers, web servers, cloud computing platforms, and data center equipment, as well as any other type of physical or virtual server machine, physical or virtual router, container, and any variation or combination thereof.

Computing system 401 may be implemented as a single apparatus, system, or device or may be implemented in a distributed manner as multiple apparatuses, systems, or devices. Computing system 401 may include, but is not limited to, processing system 402, storage system 403, software 405, communication interface system 407, and user interface system 409. Processing system 402 may be operatively coupled with storage system 403, communication interface system 407, and user interface system 409.

Processing system 402 may load and execute software 405 from storage system 403. Software 405 may include and implement sensitive data proxy process 406, which may be representative of any of the operations discussed with respect to the preceding figures. When executed by processing system 402, software 405 may direct processing system 402 to operate as described herein for at least the various processes, operational scenarios, and sequences discussed in the foregoing implementations. Computing system 401 may optionally include additional devices, features, or functionality not discussed for purposes of brevity.

In some embodiments, processing system 402 may comprise a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 may include general purpose central processing units, graphical processing units, application specific processors, and logic devices, as well as any other type of processing device, combinations, or variations thereof.

Storage system 403 may comprise any memory device or computer readable storage media readable by processing system 402 and capable of storing software 405. The memory device of storage system 403 may comprise a non-volatile data storage medium, such as a disk drive or solid state drive, or volatile memory such as random access memories (RAM) and dynamic RAM (DRAM), or any other memory apparatus for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 (including sensitive data proxy process 406 among other functions) may be implemented in program instructions that may, when executed by processing system 402, direct processing system 402 to operate as described with respect to the various operational scenarios, sequences, and processes illustrated herein. For example, software 405 may include program instructions for setting up an SDP or associated elements, routing traffic to an SDP, performing traffic monitoring, analysis, modification, or other functions at an SDP, or performing other related operations as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtualization software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to implement a bundled binding audit process as described herein. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:

implementing a sensitive data proxy configured to prevent unintended traffic from a client system to a target domain, including:

receiving a request from the client system to establish the sensitive data proxy;

receiving a message from the client system intended for the target domain;

determining a security rule to apply to the message;

evaluating the message for compliance with the security rule;

applying a corrective action to the message to bring the message into compliance with the security rule; and forwarding the message to the target domain based on the message being in compliance with the security rule.

2. The method of claim 1 further comprising:

evaluating the message for compliance with the security rule includes determining whether the message includes sensitive data; and applying the corrective action includes not forwarding the message with sensitive data to the target domain.

3. The method of claim 2 further comprising:

applying the corrective action further includes redacting the sensitive data from the message; and forwarding the message to the target domain after redacting the sensitive data.

4. The method of claim 2 further comprising:

applying the corrective action further includes:

sending a notification to the client system regarding the sensitive data in the message;

receiving a response from the client system to authorize or reject the message;

forwarding the message to the target domain based on the response authorizing the message; and not forwarding the message to the target domain based on the response rejecting the message.

5. The method of claim 2 further comprising:

generating a certificate authority (CA) certificate for a private CA; and providing the CA certificate to the client system.

6. The method of claim 5 further comprising:

receiving an indication of the target domain from the client system; and providing the client system with routing data directing the client system to route traffic intended for the target domain to the sensitive data proxy.

7. The method of claim 6 further comprising:

generating an SSL (secure socket layer) certificate, corresponding to the target domain, signed by the private CA;

providing the SSL certificate to the client system to be verified via the CA certificate; and decrypting the message based on the SSL certificate to evaluate the message.

8. The method of claim 7 further comprising:
deploying the sensitive data proxy in a cloud environment.

9. The method of claim 7 further comprising:
deploying the sensitive data proxy on premises at the client system.

10. A system comprising:
a sensitive data proxy computing environment configured to prevent unintended traffic from a client system to a target domain, including:
generate a certificate authority (CA) certificate for a private CA;
provide the CA certificate to the client system;
receive a message from the client system intended for the target domain;
determine a security rule to apply to the message;
evaluate the message for compliance with the security rule;
apply a corrective action to the message to bring the message into compliance with the security rule; and
forward the message to the target domain based on the message being in compliance with the security rule.

11. The system of claim 10 comprising the sensitive data proxy computing environment further configured to:
evaluate the message for compliance with the security rule, including determining whether the message includes sensitive data; and
apply the corrective action, including not forwarding the message with sensitive data to the target domain.

12. The system of claim 11 comprising the sensitive data proxy computing environment further configured to:
apply the corrective action, further including redacting the sensitive data from the message; and
forward the message to the target domain after redacting the sensitive data.

13. The system of claim 11 comprising the sensitive data proxy computing environment further configured to:
apply the corrective action, further including:
send a notification to the client system regarding the sensitive data in the message;
receive a response from the client system to authorize or reject the message;
forward the message to the target domain based on the response authorizing the message; and
not forward the message to the target domain based on the response rejecting the message.

14. The system of claim 11 comprising the sensitive data proxy computing environment further configured to:
receive a request from the client system to establish the sensitive data proxy;
receive an indication of the target domain from the client system; and
provide the client system with routing data directing the client system to route traffic intended for the target domain to the sensitive data proxy.

15. The system of claim 14 comprising the sensitive data proxy computing environment further configured to:
generate an SSL (secure socket layer) certificate, corresponding to the target domain, signed by the private CA;
provide the SSL certificate to the client system to be verified via the CA certificate; and
decrypt the message based on the SSL certificate to evaluate the message.

16. The system of claim 10 comprising the sensitive data proxy computing environment further configured to:
deploy the sensitive data proxy computing environment in a cloud environment.

17. A computer-readable storage medium storing instructions that, when executed, cause a processor to perform a method comprising:
implementing a sensitive data proxy configured to prevent unintended traffic from a client system to a target domain, including:
receiving a request from the client system to establish the sensitive data proxy;
generating a certificate authority (CA) certificate for a private CA;
providing the CA certificate to the client system;
receiving a message from the client system intended for the target domain;
determining a security rule to apply to the message;
evaluating the message for compliance with the security rule, including determining whether the message includes sensitive data;
applying a corrective action to the message to bring the message into compliance with the security rule, including not forwarding the message with sensitive data to the target domain; and
forwarding the message to the target domain based on the message being in compliance with the security rule.

18. The computer-readable storage medium of claim 17 storing instructions that, when executed, cause the processor to perform the method further comprising:
applying the corrective action further includes redacting the sensitive data from the message; and
forwarding the message to the target domain after redacting the sensitive data.

19. The computer-readable storage medium of claim 17 storing instructions that, when executed, cause the processor to perform the method further comprising:
applying the corrective action further includes:
sending a notification to the client system regarding the sensitive data in the message;
receiving a response from the client system to authorize or reject the message;
forwarding the message to the target domain based on the response authorizing the message; and
not forwarding the message to the target domain based on the response rejecting the message.

20. The computer-readable storage medium of claim 17 storing instructions that, when executed, cause the processor to perform the method further comprising:
receiving an indication of the target domain from the client system;
providing the client system with routing data directing the client system to route traffic intended for the target domain to the sensitive data proxy;
generating an SSL (secure socket layer) certificate, corresponding to the target domain, signed by the private CA;
providing the SSL certificate to the client system to be verified via the CA certificate; and
decrypting the message based on the SSL certificate to evaluate the message.

* * * * *